Jan. 23, 1951 — A. N. GRAY — 2,539,128
STRAINER FOR PLASTIC MATERIAL
Filed Aug. 30, 1946
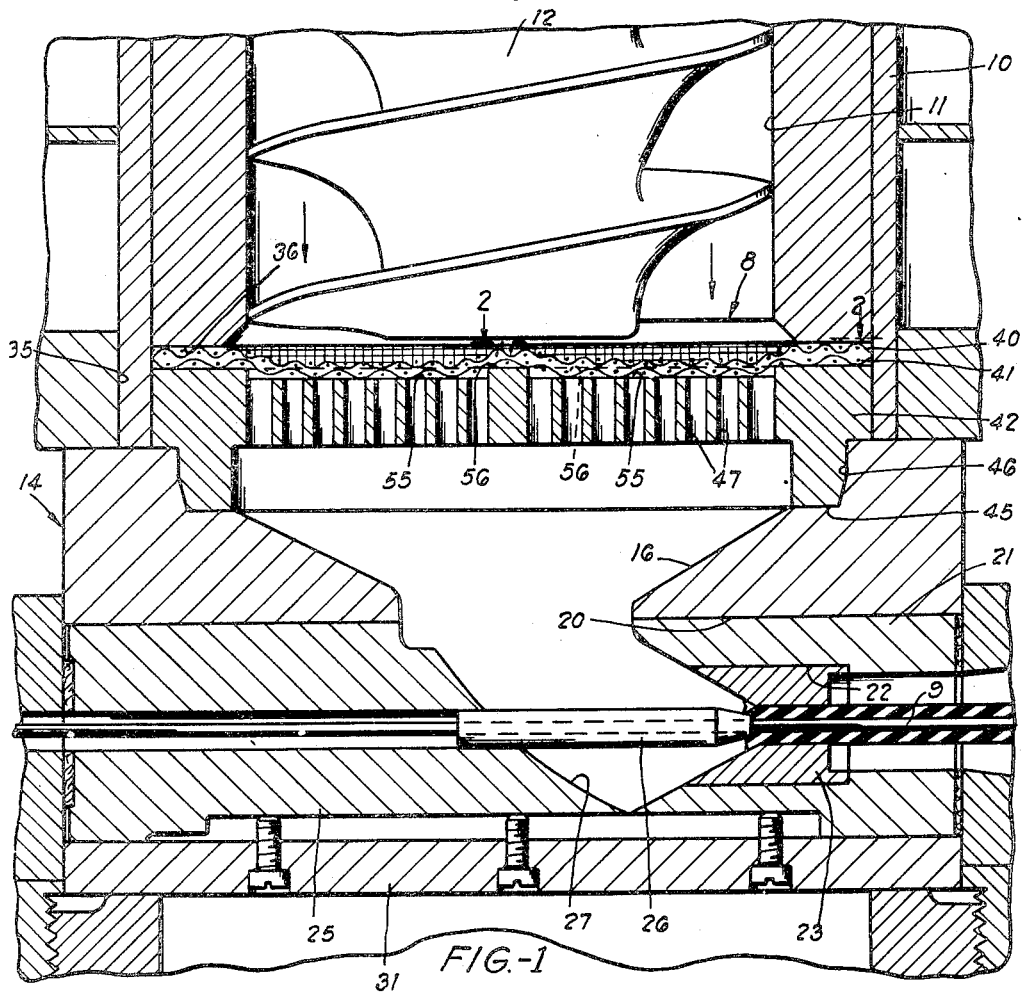
FIG.-1
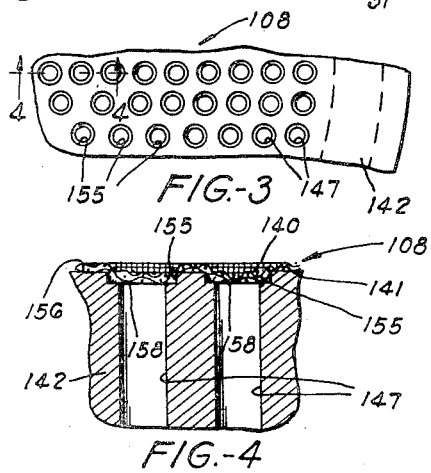
FIG.-3
FIG.-4
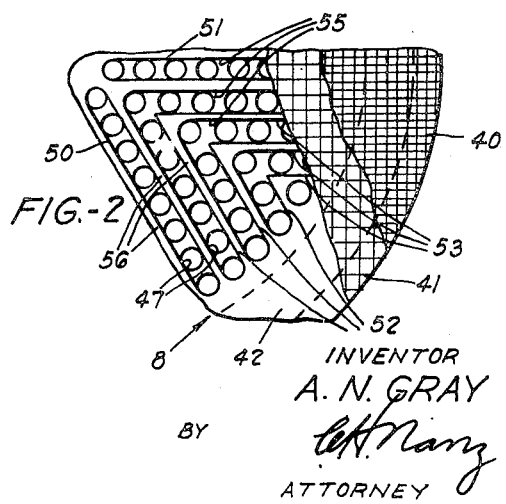
FIG.-2
INVENTOR
A. N. GRAY
BY
ATTORNEY Patented Jan. 23, 1951

2,539,128

UNITED STATES PATENT OFFICE 2,539,128

STRAINER FOR PLASTIC MATERIAL

Alvin N. Gray, Joppa, Md., assignor to Western Electric Company, Incorporated, New York, N. Y., a corporation of New York Application August 30, 1946, Serial No. 693,924

2 Claims. (Cl. 146—174)

This invention relates to strainers, and more particularly to strainers for straining oversized particles from plastic material.

In the manufacture of products from plastic material, such as vulcanizable compounds of rubber or synthetic rubber-like materials, it is sometimes desirable to strain the material. Some strainers include backing plates which have passages extending therethrough, and the backing plates work the material being forced through the passages therein to aid in plasticizing the material. The size of the passages in such a backing plate must be sufficiently small to work the material sufficiently to heat the material to the desired temperature and for the plate to have sufficient strength, but must be sufficiently large to permit the required rate of flow of the material therethrough. If screens are placed over the backing plate to strain out any oversized particles in the material, the effective area of the screens must be sufficient to permit the desired quantity of material to flow therethrough even when the screens become partially clogged from accumulated oversized particles strained from the material. In the past, no strainer including a backing plate and a screen has been known which provided sufficiently small openings in the backing plate to work the material and permit the plate to retain sufficient strength and yet retain sufficient effective screening area of the screen so that sufficient material would be passed through the screen and the backing plate if the screen became partially clogged.

An object of the invention is to provide new and improved strainers.

A further object of the invention is to provide new and improved strainers having provided both sufficient flow capacity and sufficient strength.

A strainer illustrative of the invention includes a backing plate and a screen. The screen is supported by the backing plate, and both are positioned at the end of an extrusion passage through which a stock screw forces material. The backing plate is provided with a plurality of passages therethrough which are enlarged at the portions thereof adjacent to the screen so that the effective straining area of the screen is larger than the area of the passages. Hence, when the screen becomes partially clogged from oversized particles strained from the material, there is sufficient unclogged area of the screen to permit the necessary rate of flow of the material.

A complete understanding of the invention may be obtained from the following detailed description of strainers forming specific embodiments thereof, when read in conjunction with the appended drawings, in which:

Fig. 1 is a fragmentary, horizontal section of an extrusion apparatus including a strainer forming one embodiment of the invention;

Fig. 2 is a fragmentary, end view of a portion of the strainer shown in Fig. 1;

Fig. 3 is a fragmentary, end view of a strainer forming an alternative embodiment of the invention, and Fig. 4 is an enlarged, horizontal section taken along line 4—4 of Fig. 3.

Referring now in detail to the drawings, there is shown in Fig. 1 a continuous extrusion apparatus provided with a strainer 8 forming one embodiment of the invention. The continuous extrusion apparatus is designed to apply a covering of plastic material, such as a vulcanizable compound including rubber or a synthetic rubber-like material, upon a filamentary conductor 9, which may be bare or covered with a textile or plastic covering. This apparatus includes an extrusion cylinder 10 having a cylindrical extrusion bore 11 formed therein in which an elongated stock screw 12 is rotatably mounted. The stock screw is rotated by suitable driving means, such as an electric motor and a gear train (not shown), to force the plastic material through an extruding head 14 under high pressure.

The extruding head 14 includes a body member 15 having a tapered opening 16, which forms a continuation of the extrusion bore 11 and communicates with a bore 20 formed in the extruding head transversely of the tapered opening 16. An annular die holder 21 is positioned in the exit end of the bore 20, and has a counterbore 22 formed therein in which a forming die 23 is mounted. The conductor 9 is advanced toward the right, as viewed in Fig. 1, by suitable core-advancing means, such as a capstan (not shown), through a core tube holder 25 and a core tube 26, which is held by the core tube holder. The core tube holder is provided with an inclined concave surface 27 for deflecting the plastic material toward the die 23. An aligning plate 31 maintains the die holder 21 and the core tube holder 25, and thereby the die 23 and the core tube 26, centered relative to each other in the bore 20 in the extruding head 14, and a retaining nut 32 holds these elements in place in the extruding head.

The extrusion cylinder 10 of the continuous extrusion apparatus is provided with a counterbore 35 and an annular shoulder 36. A fine straining screen 40, which should have a mesh of a size from about 50 to about 180, abuts the shoulder 36 at the outer portion of the screen and a heavy, woven backing screen 41, which should have a mesh of a size from about 16 to about 10, abuts the straining screen 40. A backing plate 42 presses the fine screen 40 through the backing screen 42 against the shoulder 36, and the backing plate 42 includes an annular projection 45. The annular projection fits into a socket 46 formed in the extrusion head, which holds the backing plate 42 in position in the counterbore 35 formed in the extrusion cylinder 10.

The backing plate 42 is provided with a plurality of cylindrical passages 47—47 through which the plastic material is forced by the stock screw 12, and which work the plastic material sufficiently to plasticize it. The passages 47—47 are arranged in radial rows, of which radial rows 50 and 51 (Fig. 2) are shown, rows 52—52, which are parallel to the radial row 50, and rows 53—53, which are parallel to the radial row 51. Grooves 55—55 extending along the rows 50—50, 51—51, 52—52 and 53—53 are formed in the backing plate 42, and are separated from each other by ribs 56—56. The grooves 55—55 are relatively shallow, and are substantially rectilinear in cross-section.

The ribs 56—56 engage the backing screen 41 and help support it against the high extrusion pressure of the plastic material being forced through the apparatus by the stock screw 11. However, the portions of the screens 40 and 41 between the ribs 56—56 sag gradually toward the portions thereof intermediate of the ribs, which intermediate portions of the screen 41 are supported by the central portions of the bottoms of the shallow grooves 55—55. Hence, the span between supporting points of the backing plate 42 is substantially shorter than the distance between adjacent ribs so that the screens 40 and 41 are not subjected to so severe strains as they would be if they were supported by only the ribs 56—56. The portions of the grooves 55—55 between the central portions of the grooves 55—55 and the ribs 56—56 are spaced from the backing screen 41 so that the plastic material may flow through the screens 40 and 41 throughout substantially the entire portions of their areas which are facing the grooves 55—55. Hence, the effective screening area of the screen 41 is much greater than the total transverse area of the passages 47—47, and even if portions of the screen 40 become clogged from oversized particles strained from plastic material, sufficient screening area is provided so that the screen 40 need not be removed from the apparatus for cleaning except at very long intervals. In contrast, if the grooves 55—55 were not provided, the screen 40 would have to be removed from the extrusion apparatus for cleaning at much shorter intervals than is necessary where the grooves 55—55 are provided.

In the operation of the apparatus described hereinabove, the plastic material is forced through the extrusion bore 11 by the stock screw 12, and is forced through the straining screen 40, which screens any oversized particles therefrom, and the backing screen 41, which supports the straining screen 40. The material is forced from the backing screen 41 through the grooves 55—55 into the passages 47—47 in the backing plate 42, which work the material sufficiently that, with the working of the material by the stock screw 12 and the screens 40 and 41, the material is plasticized when it is formed into a covering upon the conductor 9.

The material extruded upon the conductor 9 is completely strained and plasticized so that a very high quality covering is formed therefrom. The grooves 55—55 increase the effective screening area of the screen 40 to such an extent that the straining screen 40 need be removed from the apparatus only at infrequent intervals, and the straining screen 40 even though partially clogged does not greatly slow the rate of extrusion of the plastic material. The grooves 55—55 may be formed in the backing plate 42 by milling or other similar operations, which require relatively little effort.

A strainer 108 (Figs. 3 and 4) forming an altenative embodiment of the invention includes a backing plate 142, which may be used in place of the backing plate 42 (Fig. 2) in the continuous extrusion apparatus. The strainer 108 is identical with the strainer 8 except that the backing plate 142 of the strainer 108 does not include the grooves 55—55 and the ribs 56—56 of the backing plate 42. The backing plate 142 is provided with passages 147—147, and also is provided with shallow counterbores 155—155, which have a substantially larger diameter than the diameter of the passages 147—147. Hence, the area of the straining screen 40 (Fig. 1) through which material may flow into the counterbores 155—155 of the passages 147—147 is much larger than the total cross-sectional area of the passages 147—147 so that the straining screen may become partially clogged without substantially affecting the flow of the material through the plasticizing passages 147—147.

The counterbores 155—155 have sufficiently large diameters and are sufficiently shallow that a coarse backing screen 141 corresponding to the screen 41 sags into contact with inner edges 158—158 of the bottoms of the counterbores. The edges 158—158 and a face 156 of the backing plate 142 strongly support the backing screen 141 at relatively closely spaced portions thereof. The backing screen 141 is woven so that the material may flow facewise therethrough from the counterbores 155—155 to the passages 147—147. Hence, even though the backing screen 141 is in contact with the inner portions of the bottoms of the counterbores, the material flows to the passages 147—147 through all of each of the portions of the screen 140 facing the counterbores 155—155. That is, the effective straining portion of the area of each of the portions of the screen 140 directly over the counterbores and the passages 147—147 is substantially the whole of that area while the spans of the unsupported portions of the screen 141 are relatively short.

The strengths of the backing plates 42 and 142 are sufficiently high to withstand the high extrusion pressures of the material forced therethrough by the stock screw 12 and contact the screens 41 and 141 at sufficiently close points thereof so that the screens 41 and 141 are protected against undue stress, but contact these screens at small enough areas that the screens 40 and 140 have more than sufficient effective screening areas to permit the required rate of flow of plastic material therethrough even though the straining screens 40 and 140 may be partially clogged by oversized particles strained thereby.

What is claimed is:

1. A strainer for a conduit, which comprises a fine screen extending transversely across an exit of a conduit, a coarse screen abutting the fine screen for supporting the fine screen, and a backing plate provided with a plurality of passages positioned in rows therein, said backing plate being in contact with the coarse screen to support the screens against the pressure of plastic material being forced through the conduit, said backing plate also being provided with a plurality of shallow grooves extending along the rows of the passages and having a plurality of ribs positioned between the grooves for supporting the coarse screen, said grooves being shallow enough to support the coarse screen along the central portions of the bottoms thereof and deep enough to permit flow of material along the grooves, whereby the effective straining area of the screen is high.

2. A strainer, which comprises a fine straining screen extending across the exit of an extrusion bore, a coarse woven, backing screen positioned against the fine screen, and a backing plate positioned against the backing screen for supporting the backing screen on one face thereof, said backing plate being provided with a plurality of bores therein, said backing plate also being provided with shallow counterbores in the face thereof on which the backing screen is supported to support the woven backing screen at the inner portions of the bottoms of the counterbores, said counterbores permitting flow of material therethrough so that the effective straining area of the fine screen is high.

ALVIN N. GRAY.

REFERENCES CITED

The following references are of record in the file of this patent:

UNITED STATES PATENTS

| Number | Name | Date |
|---|---|---|
| 1,446,187 | Kessler | Feb. 20, 1923 |
| 1,732,618 | Royle | Oct. 22, 1929 |
| 1,931,872 | Lodge | Oct. 24, 1933 |
| 2,135,325 | Burt et al. | Nov. 1, 1938 |
| 2,249,063 | Swem | July 15, 1941 |
| 2,261,977 | Deutsch | Nov. 11, 1941 |